July 6, 1954 K. H. STRICKLER ET AL 2,682,770
MEANS FOR TESTING THE EFFICIENCY OF VEHICLE BRAKES
Filed April 11, 1949 6 Sheets-Sheet 1

Inventors,
Kenneth H. Strickler,
Karl B. Kutz.
By Harold Olsen
Attorney.

July 6, 1954     K. H. STRICKLER ET AL     2,682,770
MEANS FOR TESTING THE EFFICIENCY OF VEHICLE BRAKES
Filed April 11, 1949     6 Sheets-Sheet 5

Inventors
Kenneth H. Strickler.
Karl B. Kutz.
By Harold Olsen
Attorney.

July 6, 1954  K. H. STRICKLER ET AL  2,682,770
MEANS FOR TESTING THE EFFICIENCY OF VEHICLE BRAKES
Filed April 11, 1949  6 Sheets-Sheet 6

Inventors
Kenneth H. Strickler.
Karl B. Kutz.
By. Harold Olsen
Attorney.

Patented July 6, 1954

2,682,770

UNITED STATES PATENT OFFICE 2,682,770

MEANS FOR TESTING THE EFFICIENCY OF VEHICLE BRAKES

Kenneth H. Strickler, Arlington Heights, and Karl B. Kutz, Chicago, Ill., assignors to The Greyhound Corporation, Chicago, Ill., a corporation of Delaware Application April 11, 1949, Serial No. 86,792

5 Claims. (Cl. 73—121)

This invention relates to means for testing, while a vehicle is being driven, the reaction time of the driver in applying the brakes, and also for testing the efficiency of the brake control mechanism, and of the brakes.

The tests are carried out by a means by which, when the vehicle is travelling at some selected speed, an audible signal is given to the driver to which he reacts by applying the brakes, and in which the audible signal results from the firing of a cartridge which makes a first mark on the road. As the driver begins to press down on the brake pedal in response to the first signal, a second cartridge is fired and a second mark is made on the road and when the vehicle begins to decelerate, a third mark is made, by automatically firing a third cartridge, in response to such deceleration.

We are aware that various devices have been made for testing braking efficiency, both in the factory and on the road, but insofar as we are aware no practicable method or device has heretofore been conceived capable of properly testing for three things, to wit: The reaction time of the driver; the efficiency of the brake control mechanism; and the efficiency of the brakes.

Heretofore it has been proposed to provide a pedal switch which when closed energizes a circuit to fire a cartridge and make a mark on the road. This closure occurs at some selected vehicle speed and before the brake pedal is moved in braking direction and before deceleration of the vehicle begins. When the vehicle comes to a stop a measurement is made between the mark and the stopping point. However, this does not give the data needed to show the condition or degree of efficiency of the brake operating mechanism per se as distinguished from the condition or degree of efficiency of brakes themselves. In other words such a test does not separately test the efficiency of the elements in the braking system which are intermediate between the pedal and the braking elements per se. These intermediate elements may include linkages, hydraulic control elements, air control elements, etc. The present invention tests the degree of the efficiency or rapidity of response of these intermediate control elements, as well as driver reaction time and brake efficiency per se.

Therefore an object of this invention is to provide a safe and very reliable means for testing the reaction time of the driver for starting pressure on the brake pedal; to test the efficiency of the control mechanism of the brakes per se, and to test the braking efficiency of the brakes per se, after the same are brought into frictional engagement with their drums, by their control mechanism.

It is also among the objects of the invention to control the signalling and firing electromechanically, and to have the signalling initiated by a person other than the driver, who may be referred to as the test conductor. Electromechanical firing is completed respectively by the driver, and by vehicle deceleration. Thus two of the test operations are dependent upon human action and on the speed of action of the brake control mechanism to start vehicle deceleration, and the third is dependent on the efficiency of the brake elements per se in bringing the vehicle to a stop after deceleration has begun. Other objects of the invention are to provide a new and very efficient test apparatus; to provide for electrical operation initiated by actions respectively of a test examiner, a driver, and the vehicle; to provide a master electrical switch which must be closed and maintained in closed position by the test examiner throughout the test; to provide safety means which prevents accidental operation of the detonating elements during or after loading of the magazine with test cartridges and before the test is initiated; to provide cartridges loaded with a road marking substance; to provide solenoid control for release of firing plungers to fire the cartridges; to provide a relatively simple electrical control circuit which includes therein manual and automatic switches; and to provide a relatively simple device for holding, and for firing cartridges electrically.

Objects, features and advantages of the invention will be set forth in the description of the drawings, and in said drawings.

Figures 1, 2, 20:
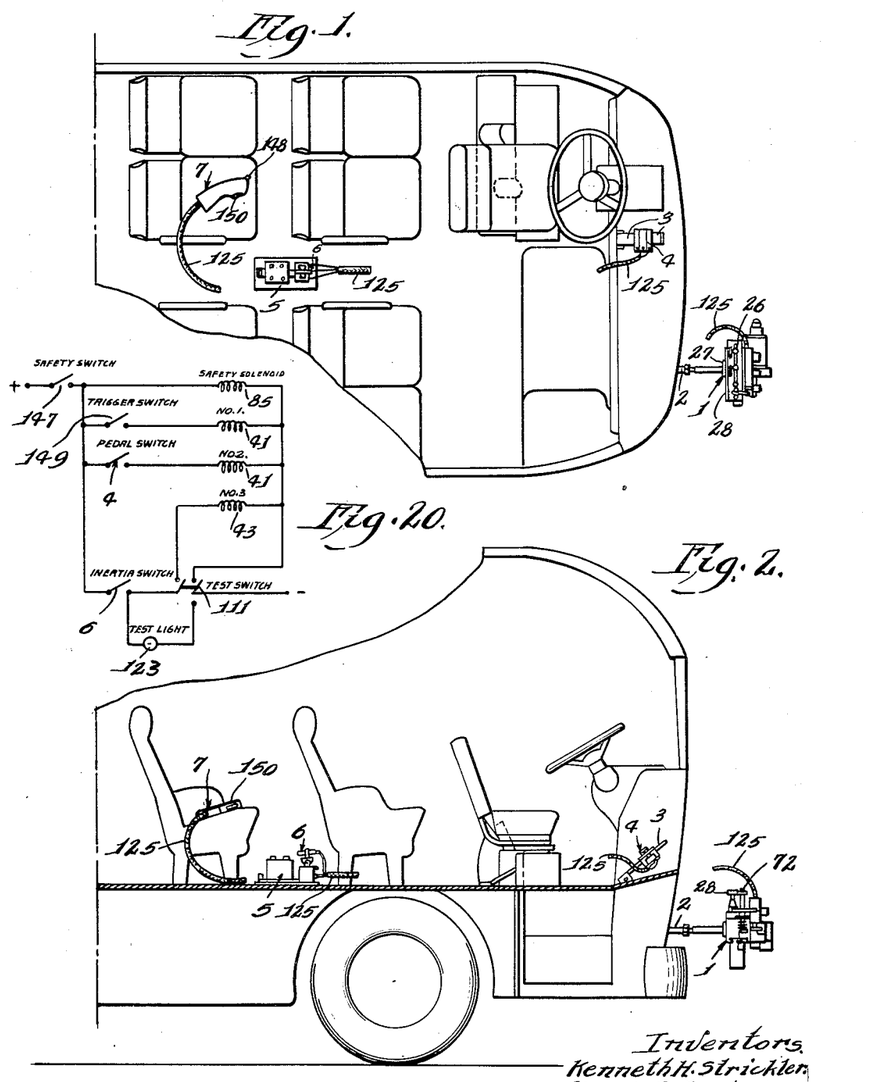
Fig. 1 is a diagrammatic plan view of a vehicle showing how the principal devices of this invention are disposed during the test period.
Fig. 2 is a diagrammatic vertical sectional view of the vehicle showing, in side elevation, the devices of Fig. 1.
Fig. 20 is a simplified electrical diagram showing how the parts of this invention are electrically controlled.
Figures 5, 6, 18, 19:
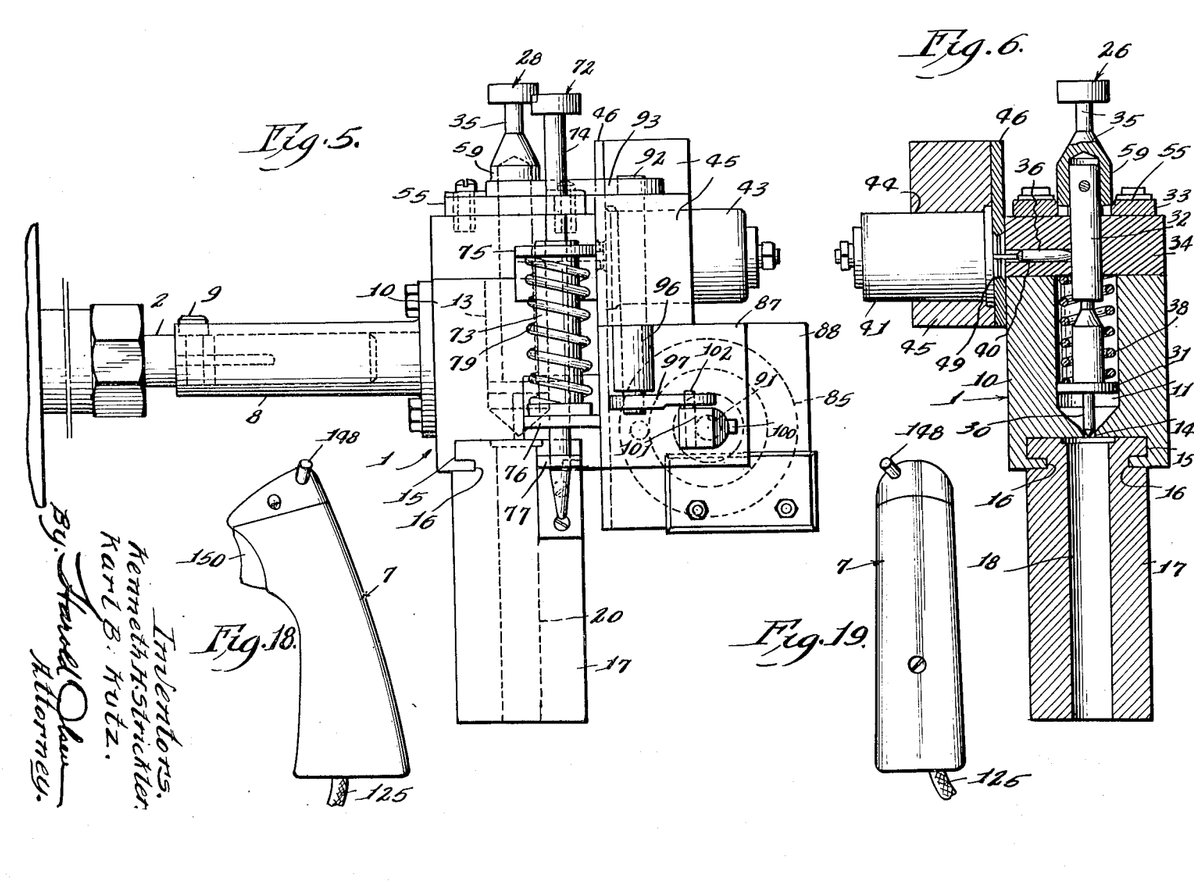
Fig. 5 is an end elevation of Fig. 3 showing the means by which the unit is connected to the vehicle.
Fig. 6 is a vertical section on line 6—6 of Fig. 4, with the firing pin slightly raised from firing position, and omitting the solenoid which controls the safety locking plate.
Fig. 18 is a side view of a pistol-grip switch unit having a thumb operable button which controls the safety and master switch of this invention and having a trigger, operable to close a switch to obtain release of one of the firing plungers, while the thumb continues to hold the safety switch button in switch-closed position.
Fig. 19 is an end elevation of the pistol grip of Fig. 18.

The invention herein can be used for testing the braking efficiency of various kinds of vehicles, but is shown as applied for the testing of the brakes of a bus. Referring to Figures 1 and 2. The principal devices of this invention are ordinarily placed as shown in these figures. The shell holder or firing unit is generally designated 1 and is attached to the front of the coach, preferably on the right hand side, near the entry door of the vehicle, by a suitable adapter 2 which may be fastened to a spare tire compartment stud. This adapter comprises a rod internally threaded at one end to fasten to the stud. The adapter has wrench facets for facilitating rotation for connecting it to the threads of the stud. As shown in Figure 5 the unit 1 has a tubular extension bolted thereto. The end of this extension is terminally split and fits over and is clamped to the adapter, by means of a threaded bolt. The shell holder 1 is thus secured, with the barrels thereof pointed at the road, and the three barrels are aligned in a direction perpendicularly to the direction of travel of the vehicle. A brake pedal or other brake control element is indicated at 3 and has a pedal switch 4, later to be described in detail. The switch is clamped to the pedal and is adapted to be closed when foot pressure is applied by the driver to set the brakes and stop the vehicle.

A battery holder and junction box and inertia switch unit is generally indicated at 5 and is ordinarily placed on the floor in the aisle near a seat. The test examiner is generally seated, in a position to observe the speedometer. The unit 5 includes a test switch, a storage battery and adjustable inertia switch 6, all later to be described. Numeral 7 indicates a pistol grip switch control element which is held in the hand of and operated by the seated test examiner. The control element has a thumb-operable safety switch which must be closed to begin the test and held closed throughout the test period, until all shells have been fired. The trigger switch of the control element is operated by the index finger while the safety switch is held closed, and operation of this trigger fires the first road marking charge to initiate the test. Cable connections of suitable length are provided to connect the switches and allow the junction box to be set on the floor in the aisle and to allow the pistol grip to be held by the seated test examiner or operator.

After the elements have been properly placed and electrically connected the inertia switch 6 is adjusted to the proper angle while the vehicle is in motion. Before the inertia switch is adjusted the test switch is thrown to "test" position. This inertia switch is so set that it will light the test light only when the vehicle begins to decelerate as a result of application of the brakes. After properly adjusting the inertia switch and clamping it in adjusted position, the test switch is moved to "fire" position, see Figure 10, and the set can then be operated to fire the first shot, after closing the safety switch.

Referring to Figs. 3 to 9, inclusive. The firing or detonating unit 1, comprises a metal block 10. This block has bolted thereto, see Fig. 5, a tubular element 8, split at the outer end and fitted over the end of the adapter 2, and clamped thereto by screw-bolt 9. This block 10 has three aligned vertical bores 11, 12, 13 therein, which are pointed toward the road. The bottom portion of each bore is downwardly tapered toward a firing-pin opening 14 which is opposed to the cap of a cartridge, see Figure 9, when the cartridge is in a barrel of the firing unit. The bottom of the block 10 is longitudinally channelled to provide a way 15 which slidably receives the grooves 16 of a barrel member or carrier block 17. This barrel member has three aligned vertically disposed barrels or bores 18, 19, 20 which are axially aligned respectively with firing plunger bores 11, 12, 13 and firing-pin openings when the barrel member is in place.

Figure 13:
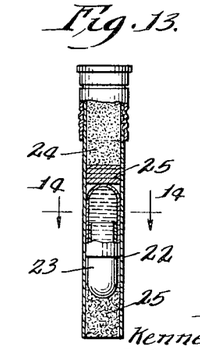
Fig. 13 is a longitudinal section of a cartridge charged with the road marking material.
Figure 14:
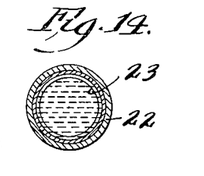
Fig. 14 is an enlarged cross section on line 14—14 of Fig. 13 taken through the pigment of paint-containing capsule.

Each barrel is adapted to receive a new type of cartridge 22, see Figs. 13 and 14, loaded with a capsule having therein a suitable colored substance such as paint. The capsule is adapted to burst, when fired against the road and make a mark thereon. In this instance each cartridge is loaded with a capsule 23 composed of telescoped sections and having a colored paint therein, yellow paint, for example. Powder is indicated at 24 and suitable wadding at 25. When the capsule hits the road it bursts and a yellow splotch is made. The distance between these splotches is measured to determine, how long it takes the driver to apply the brakes after he gets a signal, how far the bus travels before deceleration occurs, and how far the bus travels after the start of deceleration. The cartridge has the usual detonating cap, not shown, which is positioned to be engaged by the firing pin of a firing plunger. There are three plungers, designated respectively 26, 27, 28. Each plunger has a firing pin 30 extending downwardly from a guide disk 31 slidable in a corresponding bore of the block 10. Each plunger also has a stem 32 which is guided in a bore 33, of a block 34 which caps the bores 11, 12 and 13. Each plunger also has a lifting head or handle 35, attached by a pin, and by which the plunger is drawn upwardly to "cocked" position, at which it is latched in ready-to-fire position by a pin 36 engaging a shoulder 37, see Fig. 9, of the stem 32. A compression spring 38 surrounds the stem 32 and at one end engages the guide disk 31 and at the opposite end engages the block 34. When the latch pin is released the spring urges the plunger for detonating action and the firing pin 30 engages the cap of the cartridge after passing through the opening 14. In Fig. 6 the plunger is slightly raised from its firing position, but the bottom of its handle is so positioned within the slot of the safety plate as to prevent motion of the plate to safety position.

Each plunger latching pin 36 is slidable in a corresponding guide bore 40 of the block 34 and is drawn to release position by means of a solenoid, of which there are three indicated respectively at 41, 42, 43. The interior structure of these solenoids has not been illustrated, but each has an expansion spring therein which urges the latch pin to latch position, when the solenoid is energized to release the latch pin, this spring is compressed to a greater degree. The solenoids are held in suitable bores 44 of the block 45. A plate 46 is interposed between the block 45 and the block 10, and blocks 45 and 46 are secured to blocks 10 and 34 by suitable screws 48. Plate 46 has an opening 49 through which the latch pins 36 pass into the guiding bores 40. The block 34 is secured to the block 10 by means of suitable screws 50, see Fig. 3. Block 34 has three guide bores 33 one for each plunger.

Figure 3:
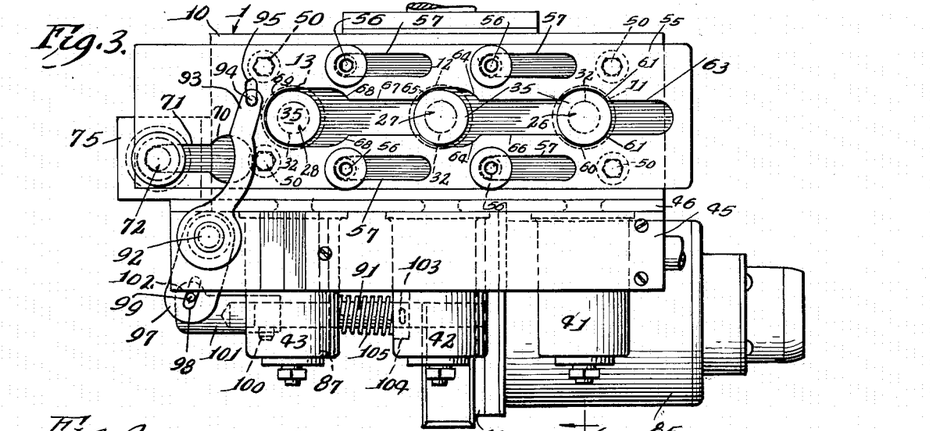
Fig. 3 is a top plan view of the detonator unit showing the plungers uncocked and with the safety locking plate in non-safety or release position as immediately after completion of a test and before reloading.
Figure 7:
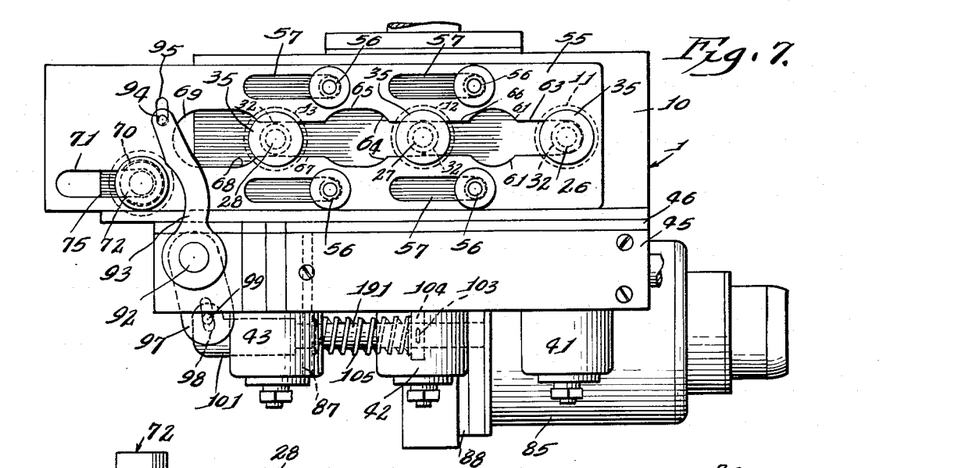
Fig. 7 is a plan view like Fig. 3, but showing the plunger safety locking plate in safety position and with the firing plungers cocked.
Figure 8:
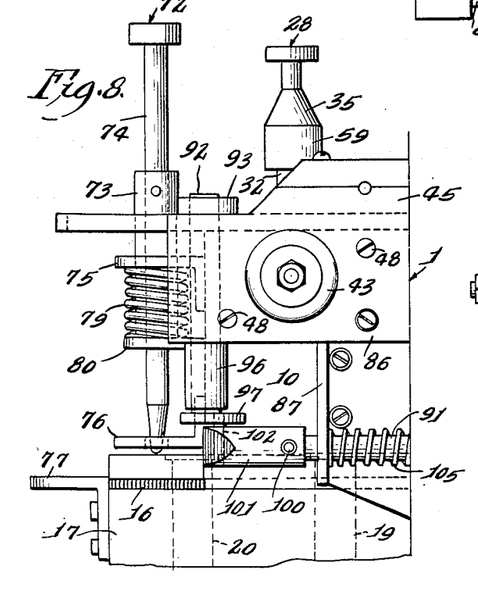
Fig. 8 is a partial side elevation of Fig. 7 showing a barrel member latching plunger in release position, and as when the barrel member is being slid out of its guides.

Safety means, see Figs. 3 and 7, is provided for preventing premature or accidental firing movements of the plungers, and this means is electrically controlled to be moved to non-safety position of Figure 3, to permit firing action of the plungers, when all is ready for the test. The safety means is moved to plunger locking position of Fig. 7 by means of a spring and it is necessary that this safety means be in the plunger locking position of Fig. 7 before the barrel member 17 can be removed for loading it with marker cartridges, or before its removal can be started. The safety means is electrically operated by a solenoid, to move it to non-safety position, and this solenoid is so placed in the control circuit that initial closure of the safety switch, to start the test, moves the safety means to non-safety or plunger release position, immediately before firing is started.

The safety means in this instance comprises a slide plate 55 secured for reciprocation to the top of the bore-capping block 34, by means of screws 56 passing through opposite pairs of aligned slots 57 of the plate and threaded into the block 34. This plate 55 has disposed centrally and extending longitudinally thereof a long specially shaped slot which is traversed by the plungers. This slot may be considered to be composed of a linear series of communicating keyhole slots. The plate is urged to plunger-locking position by a spring. The plate is moved to unlocking or non-safety position by the solenoid later to be described and thus means is provided to move the plate electrically to plunger release position, and this movement occurs immediately before the first firing plunger is released.

When it is desired to remove the magazine 17 for filling or refilling with cartridges and when the plungers are in the "down" position as in Fig. 6, it is necessary first to raise the plungers in order to allow the plate 55 to move to the left from the release position of Fig. 3 to the safety position of Fig. 7.

In Fig. 3 it is assumed that the plungers are in the lowermost position as immediately after all cartridges have been fired. Movement of the plate to the left under action of a spring is prevented until the right-hand plunger is raised because that plunger occupies the position of Fig. 6. In Fig. 3, the enlarged diameter portion 59 of the lifting head 35 of the plunger 26 is engaged in the enlarged or wider part 60 of the elongated slot which part provides portions 61 that act as stop shoulders to prevent movement of plate 55 to the left. When the right hand plunger 26 is raised to "cocked" position, the plate 55 is released and is urged part way to the left by its spring and the narrow slot portion 63 moves into opposition to the stem 32 of the raised plunger 36, see Fig. 9. But since the plunger 27 has not yet been raised, the shoulders 64 of the enlarged arcuate part 65 will engage portion 59 of the lowered plunger 27 to again stop completion of the movement of the slide 55 to its leftmost position. When the plunger 27 is cocked the plate again moves to the left and now narrow slot portion 66 moves in opposition to the stem 32 of the plunger 27. Shoulders 68 of enlarged slot portion 69 now engage the portion 59 of plunger 28 to again stop the plate in its movement to the left. Finally when plunger 28 is cocked, movement of the plate 55 to the left is completed, and it assumes its safety position of Figure 7, and the narrow slot portion 66 is now opposed to the stem 32 of the plunger 28 so that the stems of all plungers are in the narrow slot portions as in Figs. 7 and 9, and no plunger can fire a cartridge until plate 55 is moved by the solenoid to non-safety position of Fig. 3.

The plate 55 also has a further keyhole slot, the enlarged portion of which is designated 70 and the narrow portion 71. Different portions of this slot act respectively to permit or prevent release of a barrel member locking means, now to be described. This is another safety feature. The keyhole slot just mentioned is traversed by a barrel member latching plunger 72 which has stem portions of different diameters. One portion 73 is enlarged and tubular and can traverse the slot portion 70 of the keyhole slot but is too large to traverse the slot portion 71, see Figs. 7 and 8. The other stem portion 74 passes through the portion 73 and is of smaller diameter and can traverse the slot portion 71, see Figs. 3 and 4. This stem 74 acts as a stop to limit the slide 55 at such a position as will assure registration of the enlarged slot portions 61, 64, and 68, with the enlarged portions 59 of the plungers, so that the plungers can move through those slot portions to firing position. The barrel member locking plunger slides and is guided in vertically superposed openings in suitable guide brackets 75, 76 attached to the blocks 34 and 10. The lower end of the plunger stem portion 74 is tapered and is adapted to enter an opening in a bracket 77 secured to barrel member 17, to releasably latch the barrel member against movement in or withdrawal from the way 18 of the block 10, when the plate is in the safety position of Fig. 3. An expansion spring 79 surrounds tube 73 and urges the plunger 72 to the locking position of Figure 4, and this spring at its lower end abuts enlargement 80 of the tube 73 and at its upper end abuts the guide bracket 75. The plunger cannot be released until the latch plate 55 is brought to safety position of Fig. 7 so that the opening 70 of the safety plate 55 is axially aligned with the plunger axis to permit the upper portion of tube 73 to pass through the opening 70 of the keyhole slot as in Figs. 7 and 8. Only when the plunger has been raised to release position can the barrel member be withdrawn for loading, and this can be done only after all the plungers have been cocked or until the bottoms of the enlarged portions 59 have been raised above the level of the top of the safety slide 55. Unless the plungers are cocked there is nothing to maintain their portions 59 at a level above the slide 55.

Figure 4:
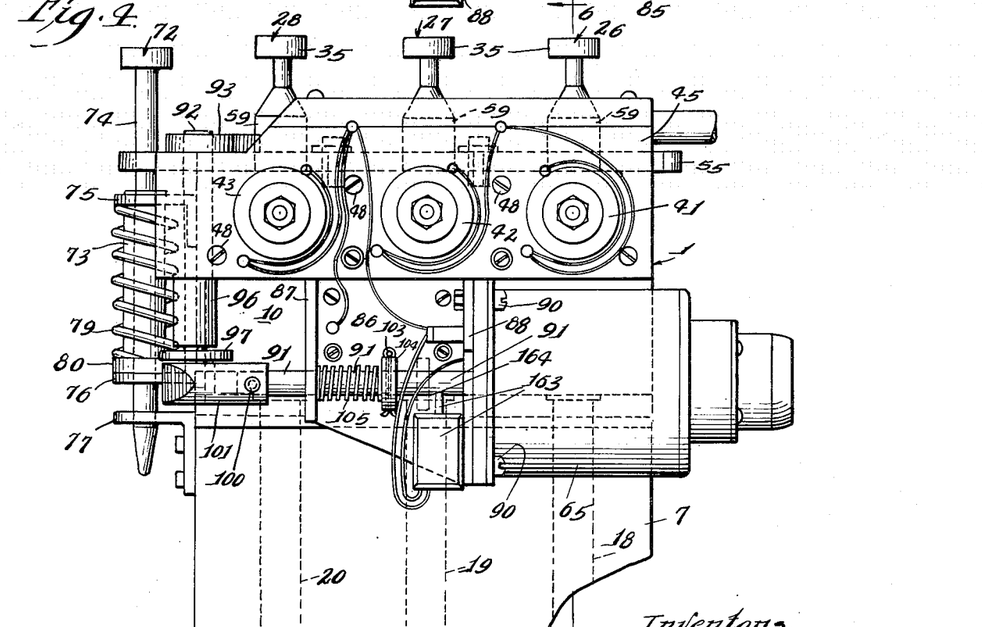
Fig. 4 is a side elevation of Fig. 3.

The safety plate 55 is electrically moved to the release position of Fig. 3 by means of a solenoid 85, and mechanical connections now to be described. The interior construction of this solenoid has not been shown. It may be of any preferred construction. The solenoid, see Figs. 3 and 4, is secured to block 10 by a bracket 86 which is U-shaped as viewed in top plan. This bracket provides two vertically disposed plate-like sides 87 and 88. One end of solenoid 85 is secured to the outer upright face of the side 88 by screws 90 and the side 87 has an opening which acts as a guide for a bar or rod 91. The solenoid plunger is not shown, but bar 91 is connected to it by means not shown. It has not been thought necessary to illustrate the interior construction of the safety solenoid 85 because it may be of any well-known construction. It should have two coils, one for pulling and the other for holding. A suitable holding circuit is provided which includes a mechanically controlled switch, which is normally open, and which is closed by the time the safety plate reaches safety position which is holding position for the solenoid.

Figure 9:
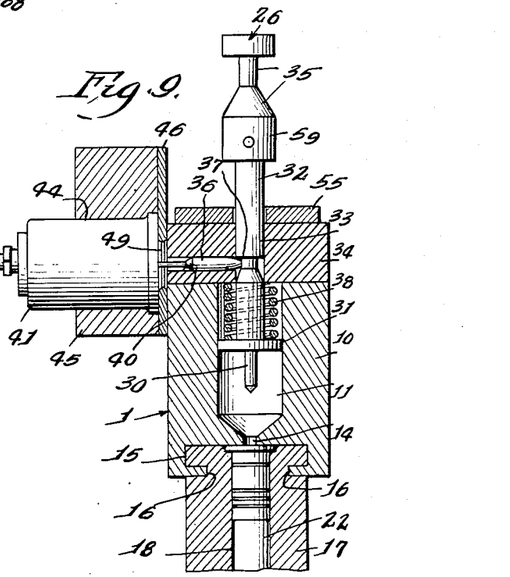
Fig. 9 is a vertical section like Fig. 6, but with the firing plunger latched in ready-to-fire position, and with cartridges in the magazine.

The solenoid 85 functions to move the safety plate from the safety position of Figs. 7 and 9, to the ready-to-fire position of Fig. 3 and to hold the plate in the latter position until all three firing plungers have been fired. The bar 91 operates a rock-shaft 92 disposed and journalled in a vertical bore of block 45, and extending above and below the block. Fixed to the rock-shaft 92 above the block 45 is an arm 93 which extends over the safety slide 55 and has a terminal downwardly directed fixed pin 94 slidable in a short cross slot 95 of slide plate 55. The rock-shaft passes through a bushing 96 extending from the bottom of the block 45, and has fixed at its lower end an arm 97 having a slot 98. Fixed on the end of the rod or bar 91, as by a set screw 100, is a tubular connector or link 101. This connector 101 has an upstanding pin 102 slidable in slot 98. Fixed to the rod 91 as by a split key 103 is a ring 104. Spring 105 surrounds the rod 91 and is under compression between the side 87 of the bracket 86 and the ring 104. This spring acts through the link, arms, and rock-shaft, to automatically move the safety plate 55 to safety position of Fig. 7, in which the stems of the cocked plungers are in the narrow parts 63, 66, 67, of the long slot and the enlargements 59 cannot move through the enlarged portions 60, 65, 69, to permit the plungers to reach firing position, even though accidentally released. Thus the plungers could not move sufficiently to fire the cartridges because the bottoms of the enlargements 59 would strike the top of the safety plate 55.

Figure 10:
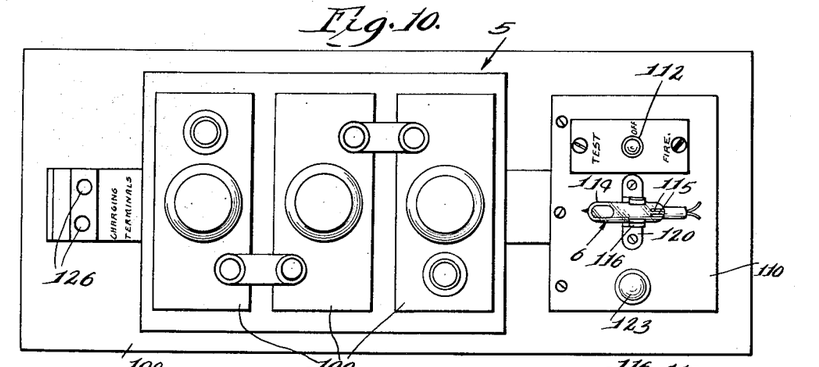
Fig. 10 is a top plan view of a unit comprising, a battery, test switch, and inertia switch, but with the cover and its carrying handle omitted.
Figure 11:
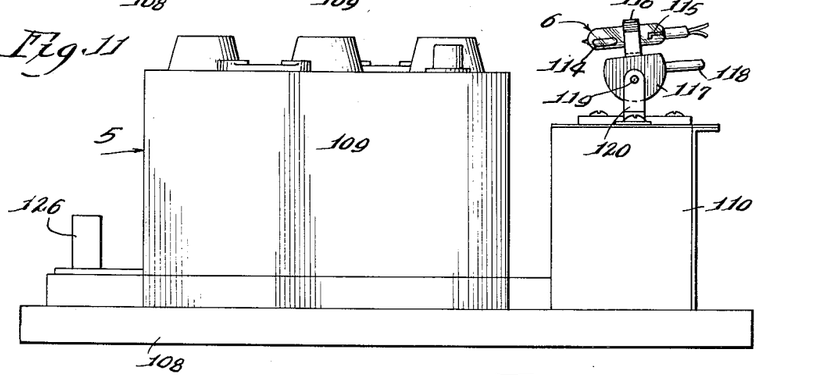
Fig. 11 is a side elevation of the unit of Fig. 10.
Figure 12:
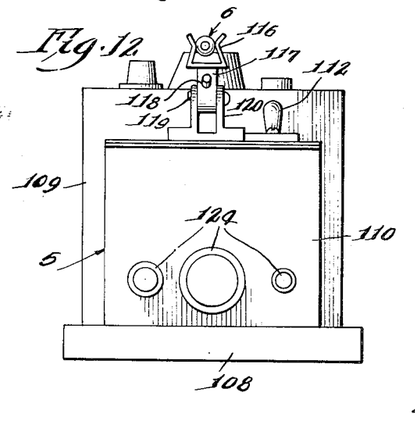
Fig. 12 is an end elevation of the unit of Fig. 11, showing the inertia switch in the foreground.

Figs. 10 to 12, inclusive, illustrate a unit previously generally designated 5. The unit includes base 108 on which are mounted a plurality of storage batteries 109, which may have 2 to 6 volts capacity. Also on the base 108 is a junction box 110. The junction box has associated therewith a double pole double throw switch 111 of the snap type, see electrical diagram Figs. 20 and 21. The switch operating button 112 is shown in Figs. 10 and 12 in its neutral position, from which it can be snapped in either direction. The tubular inertia switch has heretofore been generally designated 6, and is of the mercury type. The mercury is indicated at 114 and the two contacts at 115. The switch is detachably mounted on a spring clip 116 secured on a rockable base 117 of segmental cylindric configuration, having an adjusting handle 118. The base swings on a horizontal pivot 119, of a U-shaped bracket 120, secured to the top of a junction box 110. The base 117 is held in adjusted position by frictional clamping action of the arms of the bracket. The tube is slanted so that the mercury must run up-hill to close the contacts 114, and tube adjustment is so made as to assure closure as deceleration of the vehicle begins. The test light is indicated at 123 and is lighted when the mercury closes the contacts 115. Means by which suitable electrical connections can be made at the junction box are indicated at 124 in Fig. 12. These may be the receptacles of "amphenal" connectors, known to the art and not shown. Cables 125 of suitable length, see Figures 1 and 2, are provided to electrically interconnect the shell holder 1 and pedal switch 4 to the switches of the piston grip 7 and to the junction box so that the unit 5 can be set on the floor in the aisle as shown in Figs. 1 and 2, and so that the pistol grip switch control 7 can be held by the seated test conductor. The junction box unit 5 is provided with a cover, not shown, connected to the box by snap fasteners of the easy releasable type, and the cover is provided with a carrying handle. The battery unit is provided with charging terminals shown in Fig. 21 and in Figs. 11 and 12 and indicated at 126.

Figure 15:
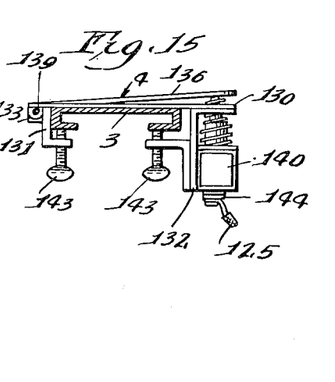
Fig. 15 is a cross section of a brake pedal, showing the pedal switch secured thereto.
Figure 16:
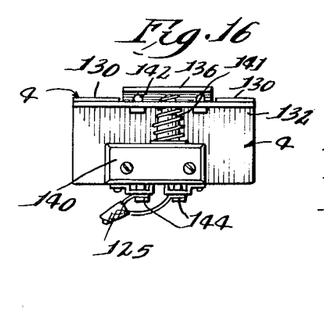
Fig. 16 is an end elevation of the pedal switch.
Figure 17:
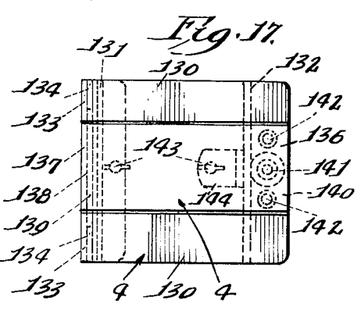
Fig. 17 is a top plan view of the pedal switch.

The essential details of the pedal switch are shown in Figs. 15 to 17, inclusive. The switch is clamped by thumb screws to the brake pedal 3 as in Figs. 1, 2 and 15. In this embodiment the switch supporting and operating elements include two spaced elongated plates 130 cross connected by parallel angle irons 131, 132. The upper edge of the vertical side of the iron 131 is welded to the undersurface of the plates 130, and the top surface of the horizontal flange of the iron 132 is welded to the plates 130. Welded to the underside of each plate and to the vertical side of iron 131 is a pivot block 133. Each block has a pintle receiving bore 134. Swingable between the plates 130 is a foot-operable switch operating plate 136 having welded thereto a pivot block 137, having a pintle receiving bore 138. A hinging pintle 139 traverses the bore 134, 138 of the blocks 133, 137. On the outer face of the vertical side of the iron 132 is attached a microswitch 140 which may be of any preferred well-known type, and the interior structure of which is not shown. The operating stem or button is indicated at 141 and is adapted to be depressed to switch closing position by downward movement of the switch operating plate 136 which is depressed by the foot of the driver as he depresses the brake pedal. Adjustable threaded stops 142 are provided to limit downward movement of the plate 136 following closure of the microswitch, so as to protect the switch from injury. The pedal switch structure is clamped to the pedal 4, see Fig. 15, by means of thumb screws 143, one of which is threaded into the horizontal flange of iron 131 and the other of which is threaded into the horizontal flange of an angle iron 144 which is welded to the iron 132. Suitable electrical connections 144 are made at the microswitch.

Since brake pedals offer some resistance to depression for obtaining application of the brakes, it may be said that the pedal switch is closed before the pedal begins to move. In any event, the switch is closed before the brake pedal is depressed sufficiently to start deceleration of the vehicle, and therefore the vehicle travels a certain distance from the time of pedal switch closure until firing of the third cartridge which is initiated by deceleration of the vehicle.

The master electrical control switch, which must be closed if the electrical system is to be operated, is incorporated in the piston grip structure 7, see Figs. 1, 18, 19 and 21. A trigger switch for controlling the circuit for firing the first signalling and roadmarking cartridge is also in this structure. This pistol grip structure is held in the hand of the person who is conducting the test, in this instance in the left hand. One of the switches is herein called the safety switch, and is designated 147. The switch is in series relation with all solenoid circuits so that it must be closed and remain closed in order for these solenoids to be energized. The solenoid circuits are, however, in parallel relation with one another so that each can be separately energized, in this embodiment sequentially energized beginning with the safety solenoid 85 and ending with the No. 3 firing solenoid, see Fig. 21. The safety switch 147 is operated by a thumb button 148 which is held down throughout the test.

Also mounted within the pistol grip structure 7 is a second switch 149 operated by a trigger 150. The function of the trigger switch is to close the electrical circuit to the solenoid 41 for firing the first road marking cartridge which also serves as a signal for the driver to apply the brakes. Closure of the trigger switch 149 is ineffective to obtain firing of the first cartridge if the switch 147 is not closed. The interior structure of the pistol grip and the particular structure of the switches 147, 149 has not been shown since any suitable known structure can be used, and such structures are known to the art. Only the arrangements of the switches in combination in the new circuit herein is considered part of this invention.

Figure 21:
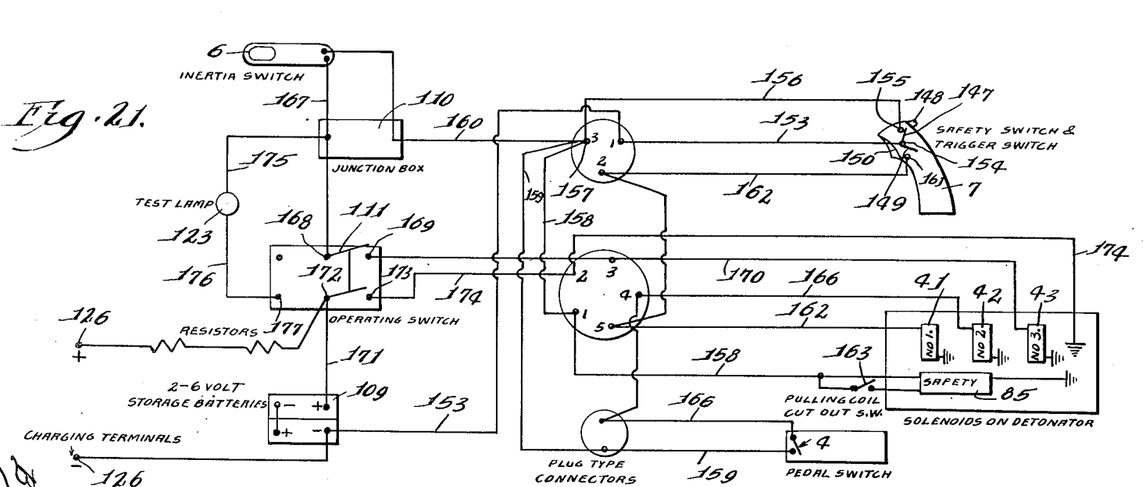
Fig. 21 is an installation wiring diagram adapted to facilitate electrical inter-connection of the various devices of this invention.

The purpose of the circuit of Fig. 21 is to facilitate the making of the electrical connections in the setting up of the apparatus of new system herein, for the proper use of the method herein for carrying out driver's reaction and brake efficiency tests. The negative side of the battery is connected by conductor 153 with a terminal 154 which is common to the master or safety switch 147 and to the trigger switch 149. The other terminal 155 of the master of the switch is connected by conductor 156 to a terminal 157, to which are also connected conductor 158 to the grounded safety solenoid 85, conductor 159 to one terminal of the pedal switch 4 and conductor 160 to one terminal of the inertia switch 6. The opposite terminal 161 of the trigger switch 149 is connected by conductor 162 with the coil of the No. 1 grounded solenoid 41. The circuit for the safety solenoid 85 includes a holding circuit having a holding switch 163 the button of which is mechanically controlled, see Fig. 4, by a cam 164 of rod 91, to close the holding switch when the solenoid is energized and to hold the switch closed during solenoid energization. The solenoid 85 is provided with two coils, an energizing and a holding coil, and the holding switch 163 closes the circuit to the holding coil. By this means electrical energy is conserved for use in energizing the firing solenoids.

The opposite terminal of pedal switch 4 is connected by conductor 166 with the No. 2 grounded firing solenoid 42. The opposite terminal of the inertia switch 6 is connected by conductor 167 with terminal 168 of switch 111. The opposite terminal 169 of switch 111 is connected by conductor 170 with the coil of the No. 3 grounded solenoid 43. The positive side of the battery 109 is connected by a conductor 171 with terminal 172 of switch 111, and the other terminal 173 of the switch is grounded by conductor 174. The test light 123 is connected by a conductor 175 to conductor 167, and by conductor 176 to the terminal 177 of switch 111. Closure of switch 111 with contacts 169, 173, conditions the electrical system for carrying out the driver and braking test, and closure of switch 111 with contacts 172, 177, conditions the system for lighting the test light during adjustment of the inertia switch 6.

The operation of the electrical system is easily traced either in Fig. 20 or in Fig. 21.

*Operation*

Figure 22:
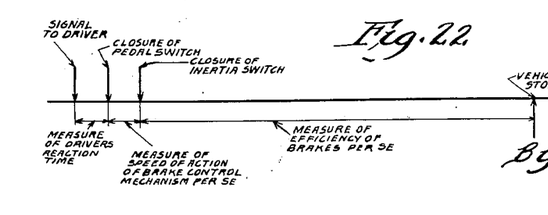
Fig. 22 is a diagram illustrating the method of marking and measuring, and the character of the data obtainable.

For carrying out the test, unit 1 is first attached to the vehicle as shown in Figs. 1 and 2 and then the various electrical connections for the devices are made, after they have been placed as shown in these figures. The simplified electrical diagram of Fig. 20 may be referred to for facilitating an understanding of the method. It may be assumed that the parts of the firing unit 1 are initially positioned as in Figs. 3 to 6, inclusive, and that the barrel member is empty. When all connections have been made and the device is otherwise ready for the test, the plungers are cocked, beginning with the right hand plunger 26 and ending with the left hand plunger 28. Since the spring 105 is under compression the safety plate moves by increment toward the left as the plungers are cocked. Only when the safety plate is in the safety position of Fig. 7 can the barrel member latch 72 be pulled upwardly, as in Fig. 8, to release the barrel member. When this is done the barrel member is withdrawn and loaded with cartridges, and reinserted, and the latch 72 is lowered to the locking position of Fig. 4. With the safety plate in safety position, the test examiner now takes his position in the vehicle and proceeds to set or adjust the inertia switch. To do this the test examiner instructs the driver to drive the vehicle at a certain speed. The examiner throws the switch 111, see Figs. 10 and 21, to "test" position. By this procedure the test light 123 and inertia switch 6 are put in circuit with the battery through the safety switch 147. The circuit is from positive side of battery through 171, 172, 177, 176, 123, 175, 167, inertia switch 6, 160, 156, 155, 147, 153 to negative side of battery. At the same time firing circuit through the safety switch is broken, contacts 169, 173, so that closure of the safety switch only results in energization of the test light when the inertia switch closes. The examiner now closes the safety switch and asks the driver to just "touch" or depress the brake pedal sufficiently to start deceleration of the vehicle at the given vehicle speed. By trial the inertia switch is set to close when this deceleration occurs. All is now ready for the test and the main switch is thrown to "Fire" position to close contacts 169, 173. The safety switch 147 is now closed by the examiner's thumb to energize solenoid 85 to move the safety plate to non-safety position of Fig. 3 to permit firing. The examiner continues to press the button 148 and hold safety switch 147 closed. The driver now drives at the speed at which the inertia switch was set, and when the examiner sees that the speedometer indicates that speed, he pulls the trigger 150 to close trigger switch 149 to energize solenoid 41 to fire the first cartridge, and make the first mark on the road. On hearing this signal the driver starts to depress the pedal and the pedal switch 4 closes to energize solenoid 42 to fire the second cartridge and make the second mark on the road. The driver continuing to press the pedal depresses the same and the vehicle begins to decelerate, and the inertia switch 6 closes to energize solenoid 43 and fire the last shot. Pedal depression continues, deceleration increases, the brakes are fully set and the vehicle comes to a stop. Measurements are now taken between the first and second marks and between the second and third marks, and between the third mark and a point on the road vertically beneath the barrel 20, after the vehicle stops. Now referring to Fig. 22. The distance between the first and second marks indicates the reaction time of the driver. The distance between the second and third marks indicates the efficiency or speed of response to the brake-operating connections per se to cause friction action of the brakes per se sufficient to start vehicle deceleration and therefore sufficient to close the inertia switch. The distance between the third mark and the stopping place of the vehicle is a measure of the efficiency of the brakes after deceleration has begun.

It will be understood that although we have herein used the sound of detonation of a road marking cartridge as a means for signalling the driver to initiate braking action, yet visual means may be used provided that marking is made to occur simultaneously therewith. Drivers are accustomed to reacting to visual signals for applying the brakes. Such a visible signal could be a puff of smoke, flash of a light, or the exhibition of a colored card, etc. The visible signal could be made by the test examiner who simultaneously therewith would pull the trigger to detonate the first marker cartridge.

Having described our invention and the various phases and construction thereof, what we claim as new and desire to secure by Letters Patent is:

1. A device of the class described for testing vehicle brakes comprising, a body unit adapted to be secured to a vehicle, a barrel member removably mounted on said body unit and having a cartridge reeciving opening therein for holding a road marking cartridge in position to be fired onto the road, a plunger in said body unit movable to engage and fire said cartridge, releasable means locking said barrel member to said body to prevent relative movement therebetween, a movable safety slide on said body unit, said safety slide being movable independently of said plunger and said barrel locking means and alternately occupying a first position positively obstructing firing movement of said plunger and permitting releasing movement of said barrel locking means and a second position obstructing releasing movement of said barrel locking means and permitting firing movement of said plunger, and remotely controlled means for moving said safety slide from one of its said positions to the other.

2. A device of the class described for testing vehicle brakes comprising, a body unit adapted to be secured to a vehicle, a barrel member removably mounted on said body unit and having a cartridge receiving opening therein for holding a road marking cartridge in position to be fired onto the road, a plunger in said body unit movable to engage and fire said cartridge, releasable means locking said barrel member to said body to prevent relative movement therebetween, movable safety means on said body unit, said safety means being movable independently of said plunger and said barrel locking means and normally occupying a position in the path of said plunger to obstruct firing movement thereof and having a second position out of the path of said plunger but obstructing releasing movement of said barrel locking means, and remotely controlled means for moving said safety means from said normal position to its said second position.

3. A device of the class described for testing vehicle brakes comprising, a body unit adapted to be secured to a vehicle, a barrel member removably mounted on said body unit and having an opening therein for holding a road marking cartridge in position to be fired onto the road, a plunger in said body unit movable from a retracted position to a firing position wherein said plunger engages and fires said cartridge, releasable means locking said barrel member to said body to prevent relative movement therebetween, movable safety means on said body unit, said safety means being movable independently of said plunger and said barrel locking means and normally occupying a position in the path of said plunger to obstruct movement thereof from said retracted position to said firing position and having a second position out of the path of said plunger but obstructing releasing movement of said barrel locking means, and means for moving said safety means from said normal position to its said second position, said plunger positively obstructing returning movement of said safety means from said second position to its normal position when said plunger is in said firing position.

4. A device of the class described, comprising a body unit and a barrel member slidable in and removable from said body unit and adapted to hold a plurality of road marking cartridges positioned to be fired at the road, a plurality of plungers in said body unit each adapted to engage and fire one of said cartridges, separate means individually latching each plunger in cocked position for firing, means for releasing said latching means to initiate firing movement of said plungers, releasable means locking said barrel member to said body unit to prevent relative movement therebetween, movable safety means on said body unit, said safety means being movable independently of said plungers and said barrel locking means and normally occupying a position in the path of said plungers to obstruct said firing movement thereof and having a second position out of the path of said plungers but obstructing releasing movement of said barrel locking means, and means for moving said safety means from one of its said positions to another.

5. A device of the class described comprising, a body unit adapted to be secured to a vehicle and having means for holding a plurality of road marking cartridges in position to be shot at the road, a plurality of plungers carried by said body, each being spring urged to detonate a cartridge, electrically releasable means for holding each plunger in retracted position, movable means for simultaneously obstructing the paths of all of said plungers to prevent accidental detonating movement thereof, said obstructing means being movable independently of said plungers and said electrically releasable means, electrically operable means for moving said obstructing means out of the path of said plungers, and an electric circuit including said electrically releasable means and said electrically operable means and switches for the operation thereof, one of said switches being an inertia operated switch actuated by a change in the acceleration of said vehicle.

References Cited in the file of this patent

UNITED STATES PATENTS

| Number | Name | Date |
| --- | --- | --- |
| 684,627 | Barney | Oct. 15, 1901 |
| 1,132,631 | Still | Mar. 23, 1915 |
| 1,417,500 | Coley et al. | May 30, 1922 |
| 1,500,214 | Wiley | July 8, 1924 |
| 1,937,219 | Driggs | Nov. 28, 1933 |
| 2,062,974 | Lane | Dec. 1, 1936 |
| 2,148,444 | DePort | Feb. 28, 1939 |
| 2,164,700 | Coffman | July 4, 1939 |
| 2,177,312 | Allgaier | Oct. 24, 1939 |
| 2,177,501 | Smalley | Oct. 24, 1939 |
| 2,186,676 | Hull et al. | Jan. 9, 1940 |
| 2,189,439 | Temple | Feb. 6, 1940 |
| 2,221,706 | Havill | Nov. 12, 1940 |
| 2,260,432 | Brown | Oct. 28, 1941 |